United States Patent [19]

Mukasa et al.

[11] Patent Number: 6,081,115
[45] Date of Patent: Jun. 27, 2000

[54] METHOD OF MEASURING EXCHANGE FORCE AND METHOD OF EVALUATING MAGNETISM USING THE EXCHANGE FORCE

[75] Inventors: Kōichi Mukasa; Kazunobu Hayakawa; Kazuhisa Sueoka; Kohji Nakamura, all of Sapporo; Yuichi Tazuke, Hitachi; Hideo Hasegawa, Koganei; Tamio Oguchi, Higashihiroshima, all of Japan

[73] Assignee: Hokkaido University, Sapporo, Japan

[21] Appl. No.: 09/049,995

[22] Filed: Mar. 30, 1998

[30] Foreign Application Priority Data

Apr. 3, 1997 [JP] Japan ................................. 9-085148

[51] Int. Cl.⁷ ........................... G01R 33/02; G01N 24/00
[52] U.S. Cl. ...................... 324/244; 324/300; 324/244.1; 250/307
[58] Field of Search .................... 324/244–244.1, 324/260, 318, 719, 758, 300; 250/306, 307, 310, 311, 423 F; 73/862.59; 365/151, 171

[56] References Cited

U.S. PATENT DOCUMENTS 5,171,992  12/1992  Clabes et al. ........................... 250/306
5,767,516  6/1998  Kawanami et al. ..................... 250/306

FOREIGN PATENT DOCUMENTS

WO 95/08109   3/1995   WIPO .

OTHER PUBLICATIONS

Michel Hehn et al., "Nanoscale Magnetic Domains in Mesoscopic Magnets", Science, American Assoc. Adv. Science, vol. 272, No. 5269, Jun. 1996, pp. 1782–1785.

Simon L. Tomlinson et al., Modelling the perturbative effect of MFM tips on soft magnetic thin films, Journal of Magnetism and Magnetic Materials, vol. 161, Aug. 1996, pp. 385–396.

V. Kottler et al., "Dichroic imaging of magnetic domains with a scanning near–field optical microscope", Journal of Magnetism and Magnetic Materials, vol. 165, 1997, pp. 398–400.

H. Ness et al., "Theoretical study of the interaction between a magnetic nanotip and a magnetic surface", Physical Review, The American Physical Society, vol. 52, No. 10, Sep. 1995, pp. 7352–7362.

K. Mukasa et al., "Spin–polarized STM and its family", Materials Science and Engineering B31, 1995, pp. 69–76.

K. Mukasa et al., "Exchange Interaction between Magnetic Moments of Ferromagnetic Sample and Tip: Possibility of Atomic–Resolution Images of Exchange Interactions using Exchange Force Microscopy", Jpn. J. Appl. Phys. vol. 33, 1994, pp. 2692–2695.

Primary Examiner—Jay Patidar
Attorney, Agent, or Firm—Venable

[57] ABSTRACT

In a method of measuring an exchange force between a specimen and a probe, the specimen and probe are faced to each other with a distance within a close proximity or RKKY-type exchange interaction region from a distance at which conduction electron clouds begin to be overlapped with each other to a distance at which localized electron clouds are not substantially overlapped with each other, a relative displacement of the specimen and probe is detected to measure a first force under such a condition that directions of magnetic moments of said specimen surface and probe are in parallel with each other to derive a first force and under such a condition that directions of magnetic moments of said specimen surface and probe are in anti-parallel with each other to derive a second force. An exchange force is derived as a difference between said first and second forces. Magnetic property of the specimen can be evaluated on the basis of the thus measured exchange force.

9 Claims, 9 Drawing Sheets

FIG_1

FIG_2

FIG_8A

FIG_8B

FIG_9

METHOD OF MEASURING EXCHANGE FORCE AND METHOD OF EVALUATING MAGNETISM USING THE EXCHANGE FORCE

BACKGROUND OF THE INVENTION

1) Field of the Invention

The present invention relates to a method of measuring an exchange force between a surface of a specimen and a probe which is faced to the specimen surface by a very small distance, and also relates to a method of evaluating a surface magnetism of a specimen using the exchange force.

2) Description of the Related Art

Figure 1:
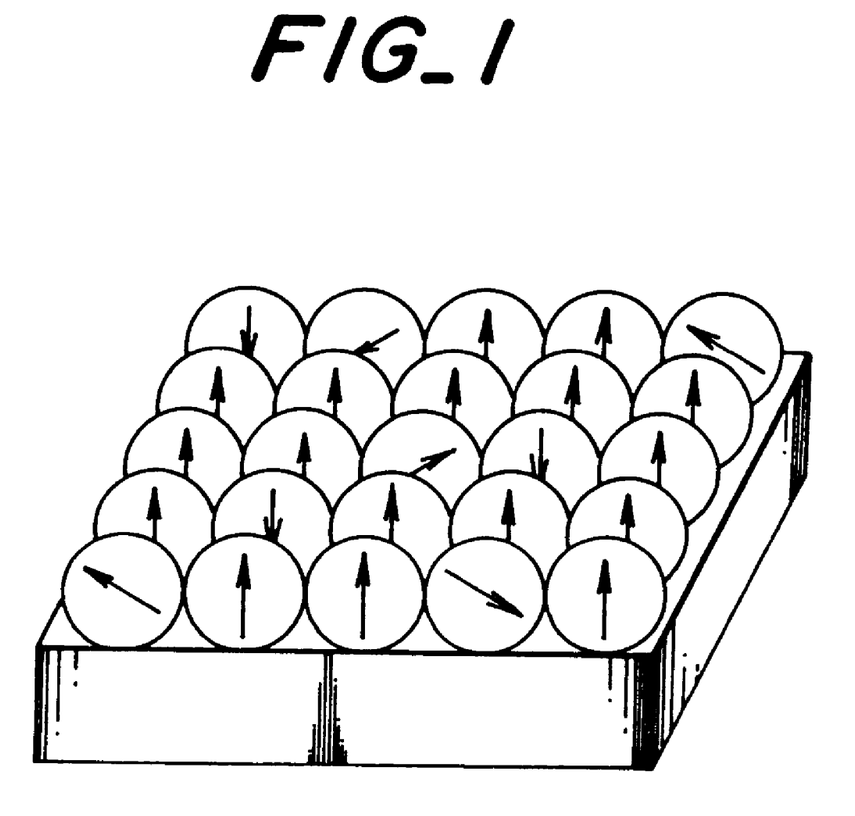
FIG. 1 is a schematic view showing the atomic structure of a magnetic specimen surface.

Heretofore, in many known methods of analyzing solid specimens using an electron beam, the intensity (the number of electrons) and the kinetic energy are adopted as a measure for analysis. Another measure for the investigation is electron spin. There have been proposed several methods of evaluating a microscopic surface magnetism of a solid substance on the basis of the electron spin. For instance, there have been proposed several methods of determining directions of magnetic moments of respective atoms with atomic resolution as illustrated in FIG. 1.

Figure 2:
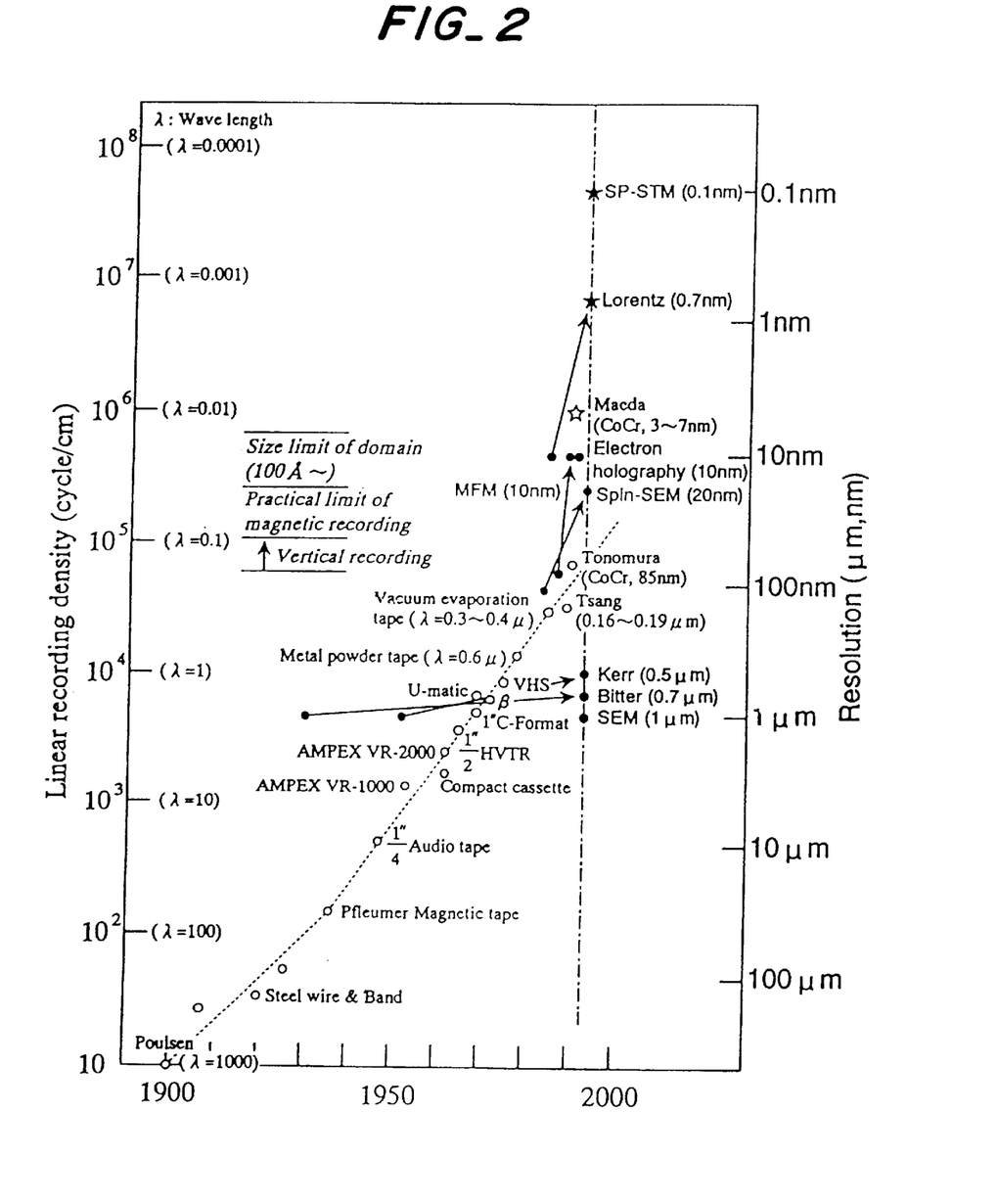
FIG. 2 is a diagram representing progress in magnetic medium, linear record density, evaluating method and the resolution.

In accordance with recent progress in electronics, a recording density on magnetic recording medium has become higher year after year. FIG. 2 is a chart representing a variation of the recording density in accordance with progress in the magnetic recording medium and various methods of evaluating the surface magnetism. The horizontal axis denotes a time in the Gregorian year, the left-hand vertical axis a linear recording density (cycle/cm), and the right-hand vertical axis represents a resolution of methods of evaluating the surface magnetism in $\mu$m and nm. Magnetic recording began in 1900 having a wavelength of 1 mm and have become more and more dense. The density of modern day hard disks is 0.16–0.19 $\mu$m. By the electron holography, magnetic bits of 0.085 $\mu$m were observed on Co-Cr media. The resolution in evaluation methods of surface magnetism has been improved. The resolution of the Bitter technique has been improved from 1 $\mu$m to 0.7 $\mu$m, and the resolution of the Kerr effect method has improved from 1 $\mu$m to 0.5 $\mu$m. The resolution of the spin-polarized scanning electron microscopy (SP SEM) has improved from 100–200 $\mu$m in 1984 to 20 nm in 1994. The magnetic force microscopy (MFM) had a resolution of 100 nm in 1987 and had a resolution of 10 nm in 1988. The electron holography had a resolution of 10 nm in 1991 and the Lorentz microscopy has a resolution of 10 nm now and will have a resolution of 0.7 nm in a near feature.

As explained above, the resolution of surface magnetic evaluation has become higher and higher. However, a higher resolution is required on in either basic studies of material properties or engineering, for instance magnetic recording. Hence, it has been earnestly required to develop an evaluation method which can evaluate magnetic properties of a solid surface with an atomic resolution. The inventors of the present application have proposed a spin-polarized scanning tunneling microscopy (SP-STM).

Figure 3:
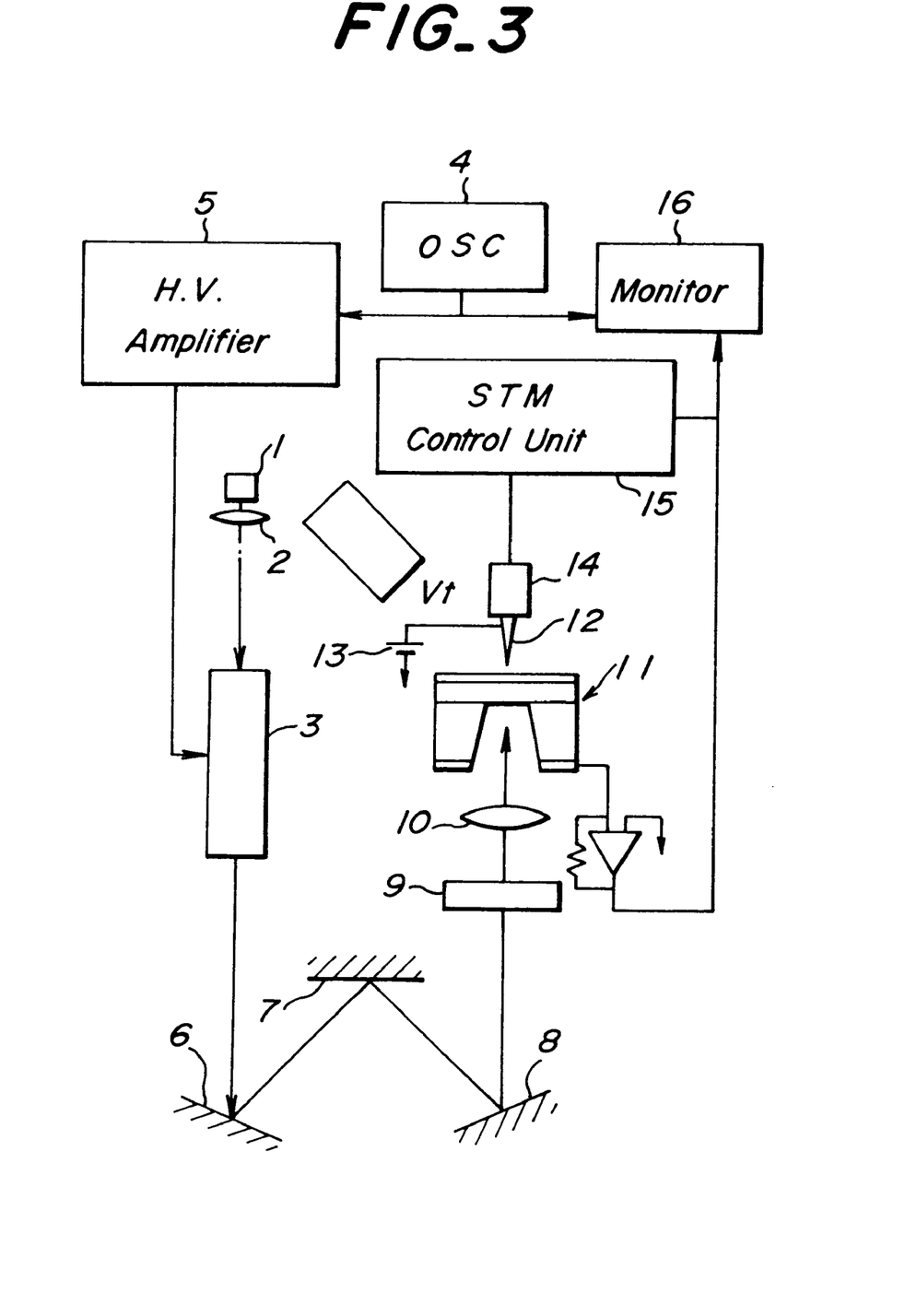
FIG. 3 is a schematic view illustrating a construction of a known spin-polarized scanning tunneling microscopy.
Figure 4:
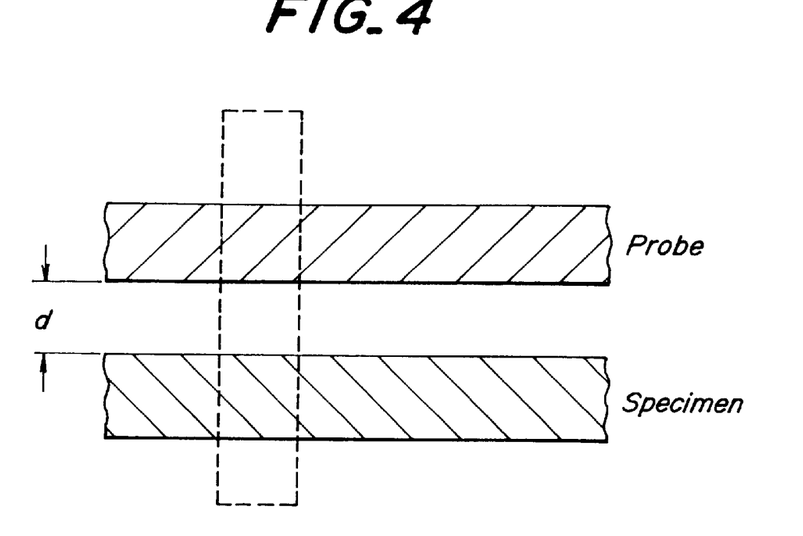
FIG. 4 is a schematic view showing specimen and probe used in calculation for a principle of the method according to the invention.

FIG. 3 is a schematic view illustrating an experimental apparatus for proving the utility of SP-STM. In an actual SP-STM, a specimen is made of a magnetic material and a probe is made of gallium arsenide (GaAs). However, in the experimental apparatus, a specimen was made of GaAs and a probe was made of nickel (Ni). This does not cause any problem as long as the principle of the SP-STM is investigated. A single-mode laser diode 1 was used as a linearly polarized light source of about 830 nm in wavelength and about 30 mW in maximum output power. Linearly polarized laser beam was made incident upon a Pockels cell 3 by means of an lens 2. To the Pockels cell 3, was applied a high voltage from an oscillator 4 via a high voltage amplifier 5. Then, an excited circularly polarized laser beam was modulated into right-hand circularly polarization and left-hand circularly polarization at a modulation frequency of about 400 Hz. In this manner, the spin-polarization of excited electrons was changed. The modulated laser beam was made incident upon a specimen 11 as exciting light by means of reflection mirror 6–8, $\lambda$/4 plate 9 and lens 10. A probe 12 made of a crystal wire of Ni was biased by a DC voltage source 13 was brought into a close proximity of the surface of specimen 11 under the control of a Piezoelectric element 14 such that a tunneling current could flow from the specimen to the probe. The generated tunneling current was detected by a control unit 15, and an output signal of the control unit was supplied to a monitor 16 together with an output signal from the oscillator 4. In this manner, the tunneling current depending upon the spin-polarization of the surface of specimen 11 was detected.

In the SP-STM, the tunneling current produced by the radiation excitation is detected, and thus could not be applied to electrically insulating magnetic materials. The inventors have proposed an atomic force microscopy (AMF) which can detect the exchange force between a sample and a probe. Such an atomic force microscopy can be applied to insulating objects. In the known atomic force microscopy, a tip of a probe is brought into contact with a specimen or is brought in a close proximity of a specimen and a force applied to the probe is detected. The inventors have investigated such an atomic force microscopy for evaluating the surface magnetism of a specimen by measuring the exchange force between the probe and the specimen surface.

In the known atomic force microscopy, the measurement is performed within a non-contact region in which the tip of the probe is separated from the specimen surface by a relatively large distance or within a contact region in which the tip of probe is brought into contact with the specimen surface. In the measurement within the non-contact region, magnetic forces produced between magnetic dipoles are measured. However, these forces are of a long-range force, and thus it is impossible to realize an atomic resolution. In the measurement within the contact region, although it would be possible to evaluate the surface structure with an atomic resolution, it is impossible to measure the exchange force between the specimen and the probe in an accurate manner, because the probe tip is brought into contact with the specimen surface and is influenced by magnetic properties of the specimen surface. Therefore, it is impossible to evaluate inherent magnetism of the specimen surface in an accurate manner.

SUMMARY OF THE INVENTION

The present invention has for its object to provide a novel and useful method of measuring the exchange force between a probe and an electrically conductive or electrically insulating specimen with an atomic resolution.

It is another object of the invention to provide a method for evaluating magnetic properties of a specimen surface with an atomic resolution without influencing the magnetic properties of the specimen.

According to the invention, a method of measuring an exchange force between two substances each of which contains localized electrons and at least one of which contains conduction electrons, wherein said two substances are faced to each other by a distance within a close proximity region from a distance at which conduction electron clouds begin to be overlapped with each other to a distance at which localized electron clouds are not substantially overlapped with each other, and an exchange force between said two substances is measured.

According to the invention, a method of measuring an exchange force between two substances each of which contains localized electrons and at least one of which contains conduction electrons comprises the steps of:

facing said two substances to each other by a distance within a close proximity region from a distance at which conduction electron clouds begin to be overlapped with each other to a distance at which localized electron clouds are not substantially overlapped with each other;

measuring an exchange force between said two substances under such a condition that directions of magnetic moments of said two substances are in parallel with each other to derive a first force;

measuring an exchange force between said two substances under such a condition that directions of magnetic moments of said two substances are in anti-parallel with each other to derive a second force; and deriving a difference between said first and second forces as the exchange force between said two substances.

According to the invention, a method of measuring an exchange force between a specimen surface and a probe comprises the steps of:

facing said specimen surface and probe to each other by a distance within a close proximity region from a distance at which conduction electron clouds begin to be overlapped with each other to a distance at which localized electron clouds are not substantially overlapped with each other;

measuring a force applied to said probe under such a condition that directions of magnetic moments of said specimen surface and probe are in parallel with each other to derive a first force;

measuring a applied to said probe under such a condition that directions of magnetic moments of said specimen surface and probe are in anti-parallel with each other to derive a second force; and deriving a difference between said first and second forces as the exchange force between said specimen surface and said probe.

According to the invention, a method of evaluating magnetic property of two substances each of which contains localized electrons, at least one of which contains conduction electrons and magnetic property of at least one of which is known, comprises the steps of:

facing said two substances to each other by a distance within a close proximity region from a distance at which conduction electron clouds begin to be overlapped with each other to a distance at which localized electron clouds are not substantially overlapped with each other;

measuring a force between said two substances under such a condition that directions of magnetic moments of said two substances are in parallel with each other to derive a first force;

measuring a force between said two substances under such a condition that directions of magnetic moments of said two substances are in anti-parallel with each other to derive a second force;

deriving a difference between said first and second forces as the exchange force between said two substances; and evaluating magnetic property of the other of said two substances on the basis of said exchange force between said two substances.

According to the invention, a method of evaluating magnetic property of a specimen by measuring an exchange force between said specimen and a probe whose magnetic property is known comprises the steps of:

facing said specimen surface and probe to each other by a distance within a close proximity region from a distance at which conduction electron clouds begin to be overlapped with each other to a distance at which localized electron clouds are not substantially overlapped with each other;

measuring a force applied to said probe under such a condition that directions of magnetic moments of said specimen surface and probe are in parallel with each other to derive a first force;

measuring a force applied to said probe under such a condition that directions of magnetic moments of said specimen surface and probe are in anti-parallel with each other to derive a second force;

deriving a difference between said first and second forces as the exchange force between said specimen surface and said probe; and evaluating the magnetic property of said specimen surface on the basis of said exchange force between said specimen surface and said probe.

In a case of measuring an exchange force between a specimen made of transition metal having a lattice constant a and a probe made of the same transition metal, the probe is faced to the specimen surface by a distance d while a condition $1.0 \leq d/a \leq 1.7$ is satisfied.

In the method according to the invention, it is preferable to perform the measurement of the exchange force plural times to derive a plurality of exchange force by changing a distance between the specimen and the probe is changed within said close proximate region, and the magnetic properties of the specimen are evaluated by considering totally said plurality of exchange forces.

DESCRIPTION OF THE PREFERRED EMBODIMENT

Figure 5:
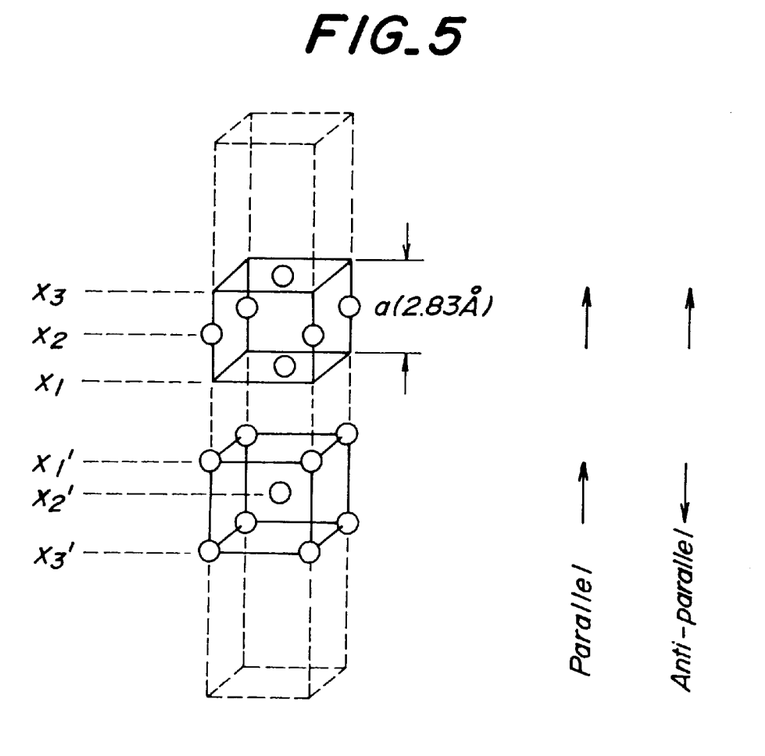
FIG. 5 is a schematic view illustrating a model of atomic structure of the specimen and probe.

At first, we consider a simple model, in which two thin films made of iron which is a 3d transition metal are brought together in close proximity. One of the thin iron films may be a specimen and the other may be a probe. In actual measurement, the specimen may be considered as a thin film, but the probe is a very sharp tip and could not be considered as a thin film. However, in a microscopic view point, the probe may be also considered as a thin film. It is also assumed that each of the two thin films has a structure constructed by three atom layers as illustrated in FIG. 5, (001) surfaces of the thin films are faced to each other by a distance d, and a lattice constant of thin films is a (2.83 Å).

When an origin of coordinates is set at a middle point between the two films, a position of atoms of a first layer $x_1$ of the first thin film is expressed by $x_1(0, 0, d/2)$, a position of atoms of a second layer $x_2$ is expressed by $x_2(a/2, a/2, d/2+a/2)$, and a position of atoms of a third layer $x_3$ is expressed by $x_3(0, 0, d/2+a)$. Similarly, in the second thin film, a position of atoms of a first layer $x_1'$ is expressed by $x_1(a/2, a/2, -d/2)$, a position of atoms of a second layer $x_2$ is expressed by $x_2'(0, 0, -d/2-a/2)$, and a position of atoms of a third layer $x_3$ is expressed by $x_3'(a/2, a/2, -d/2-a)$. The surface relaxation is not considered. So, lattices is assumed to be rigid.

Since the exchange force between the two thin films can be derived as a difference between a force obtained under a condition that directions of magnetic moments of these thin films are in parallel with each other and a second force obtained under a condition that directions of magnetic moments of the thin films are in anti-parallel with each other. Therefore, a dependency of these first and second forces upon a distance between the two thin films has been investigated. It has been derived by the first principle calculation using the local-spin approximation to the density-functional theory. Upon calculation, the full potential linear argumented plane wave (LAPW) method was simplified. The inventors have reported in, for instance Japanese Journal of Applied Physics, Vol. 33 (1994), pp. 2692–2695, Materials Science and Engineering B31 (1995), pp. 69–76, and Physical Review B56(1995), pp. 3218–3321, calculation results of forces applied to respective atoms under such a condition that directions of magnetic moments are parallel with each other. In order to measure an actual exchange force, it is necessary to derive a difference between a force measured under such a condition that directions of magnetic moments are in parallel with each other and a force measured under such a condition that directions of magnetic moments are in anti-parallel with each other.

Figure 6:
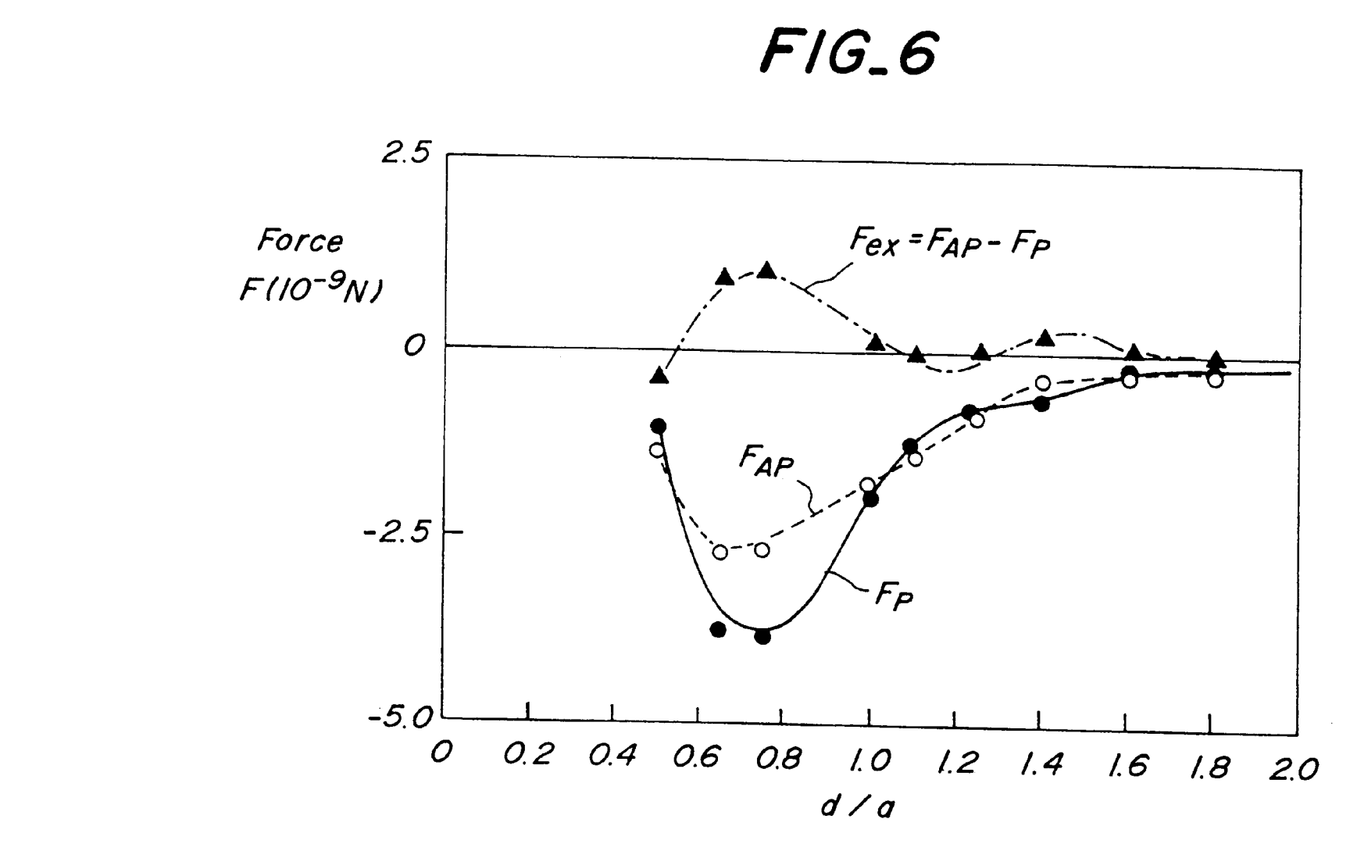
FIG. 6 is a graph representing a distance dependency of a force between the specimen and the probe.

According to the invention, not only force applied to the respective thin films under the parallel condition of magnetic moments, but also force applied to the respective thin films under the condition of the anti-parallel condition of magnetic moments are calculated in an extremely precise manner, and calculation results shown in FIG. 6 could be obtained. In FIG. 6, the horizontal axis denotes a distance d normalized by the lattice constant a (d/a) and the vertical axis shows a force F ($10^{-9}$ N). A curve $F_P$ represents the force in the parallel condition and a curve $F_{AP}$ shows the force in the anti-parallel condition.

The force between the thin films contain forces other than the exchange force, and therefore in order to derive only the exchange force, it is necessary to cancel out the forces other than the exchange force by deriving a difference between them. In FIG. 6, the calculated exchange force is shown by a curve $F_{ex}=F_{AP}-F_P$. As can be seen from the curve $F_{ex}$, the exchange force has a large dependency upon the distance d between the two thin films. Within a region of d/a≦1.7, the exchange force appears. Particularly, within a region of d/a<1.0, a large exchange force is recognized. Within a region of 1.0≦d/a ≦1.7, the existence of the exchange force is recognized. However, in a region of d/a>2.0, no exchange force could appear.

Figure 7:
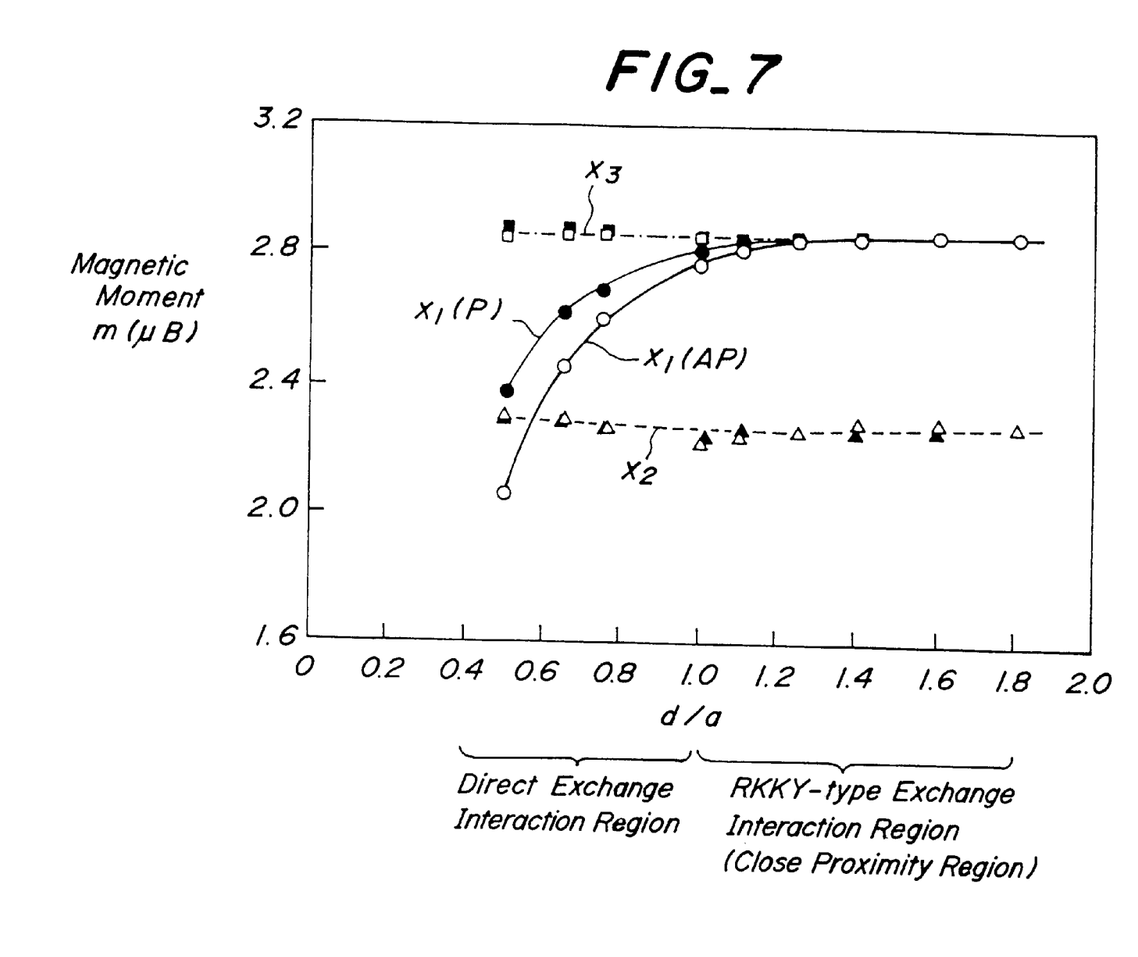
FIG. 7 is a graph showing a distance dependency of magnetic moment of the specimen.

Then, a dependency of the magnetic moment of the thin film under the parallel and the anti-parallel conditions has been investigated and a result shown in FIG. 7 was obtained. In FIG. 7, the horizontal axis denotes a distance a between the thin films normalized by the lattice constant a (d/a), and the vertical axis represents the magnetic moments m($\mu$B). Curves $X_1(P)$ and $x_1(AP)$, $x_2$ and $x_3$ show magnetic moments of atoms in the layers $x_1$, $x_2$ and $x_3$, respectively. The curve $X_1(P)$ shows a change in the magnetic moment under the parallel condition and the curve $x_1(AP)$ represents a change in the magnetic moment under the anti-parallel condition. The magnetic moments of atoms in the second layer $x_2$ are substantially identical with that of the bulk. When the normalized distance d/a between the two thin films is smaller than 1.0, the magnetic moment of the first layer $x_1$ is greatly deceased. This means that atoms in this first layer $x_1$ are subjected to the direct exchange interaction. Within the region in which the normalized distance d/a is smaller than 1.0, spins in the first thin film are directly exchange interacted. Therefore, in the present invention, this region is called a direct exchange interaction region. As explained above with reference to FIG. 6, in the direct exchange interaction region of the normalized distance d/a smaller than 1.0, it is possible to attain a large exchange force. However, within this direct exchange interaction region, the magnetic moment changes largely, and therefore the magnetic structure of a specimen surface might be affected by the probe and the magnetic property of the specimen surface could not be evaluated accurately.

Figure 8A:
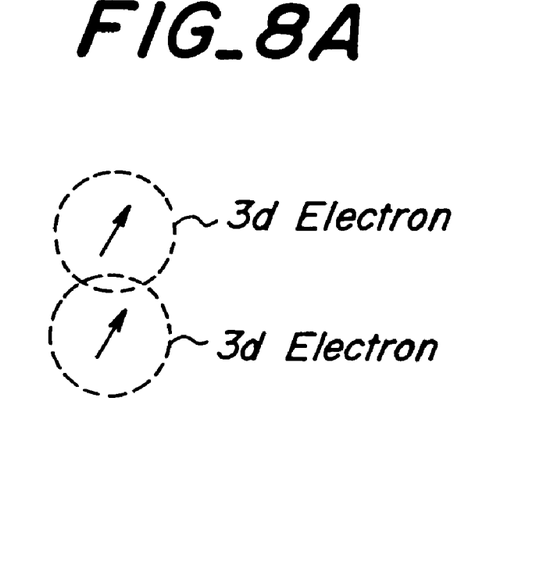
FIGS. 8A and 8B are schematic diagrams showing the condition of electrons within a direct exchange interaction region and an RKKY-type interaction region.
Figure 8B:
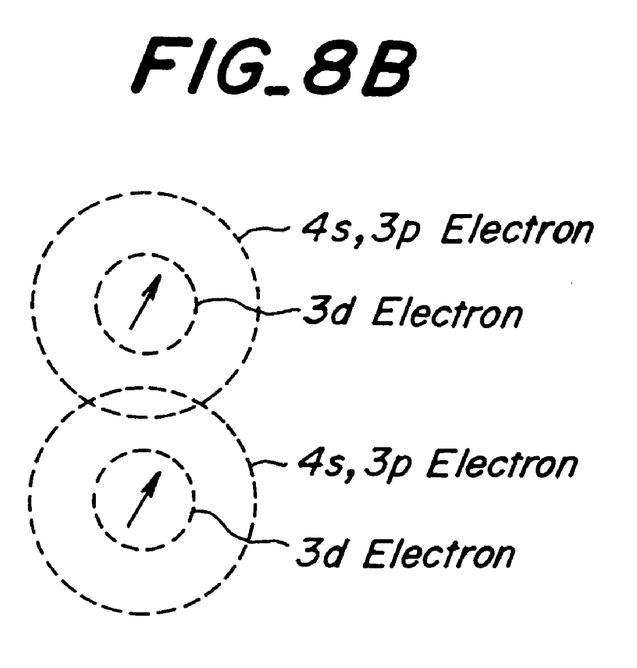

According to the invention, it is extremely preferable to measure the exchange force within the region of 1.0≦d/a≦1.7. In the direct exchange interaction region of d/a<1.0, the localized electron clouds (wave functions) of, for instance 3d orbitals are overlapped with each other as shown in FIG. 8A, and in the region of 1.0≦d/a≦1.7, although the localized electron clouds are separated from each other as depicted in FIG. 8B, the conduction electron clouds (wave functions) of 4s and 3p orbitals are overlapped with each other. Therefore, according to the invention, the exchange force is measured by separating a specimen surface and a probe from each other by a distance within a region from a distance at which the conduction electron clouds of 4s and 3p orbitals begin to be overlapped with each other to a distance at which the localized electron clouds of 3d orbital are not substantially overlapped with each other. In the present specification, such a region is called a RKKY-type exchange interaction region. The measurement of the exchange force according to the invention is applied not only to the above mentioned 3d transition metal, but also to molecules revealing magnetism, 4f rare earth metals and compounds and magnetic semiconductors. It should be noted that the present invention may be equally applied to two substances each of which includes localized spins and at least one of which contains conduction electrons.

As explained above with reference to FIG. 6, the magnitude of the exchange force $F_{ex}$ measured in the RKKY-type exchange interaction region, i.e. $1.0 \leq d/a \leq 1.7$ is smaller than that measured in the direct exchange interaction region, but is still of order of $10^{-10}$ N. The exchange force having such a magnitude can be measured, because the conventional atomic force microscope has a resolution of about $10^{-12}$ to $10^{-13}$ N. Furthermore, this RKKY-type exchange force changes in a sinusoidal manner, and thus the exchange force can be measured accurately using such a characteristic.

Now an apparatus for performing the method according to the invention will be explained.

Figure 9:
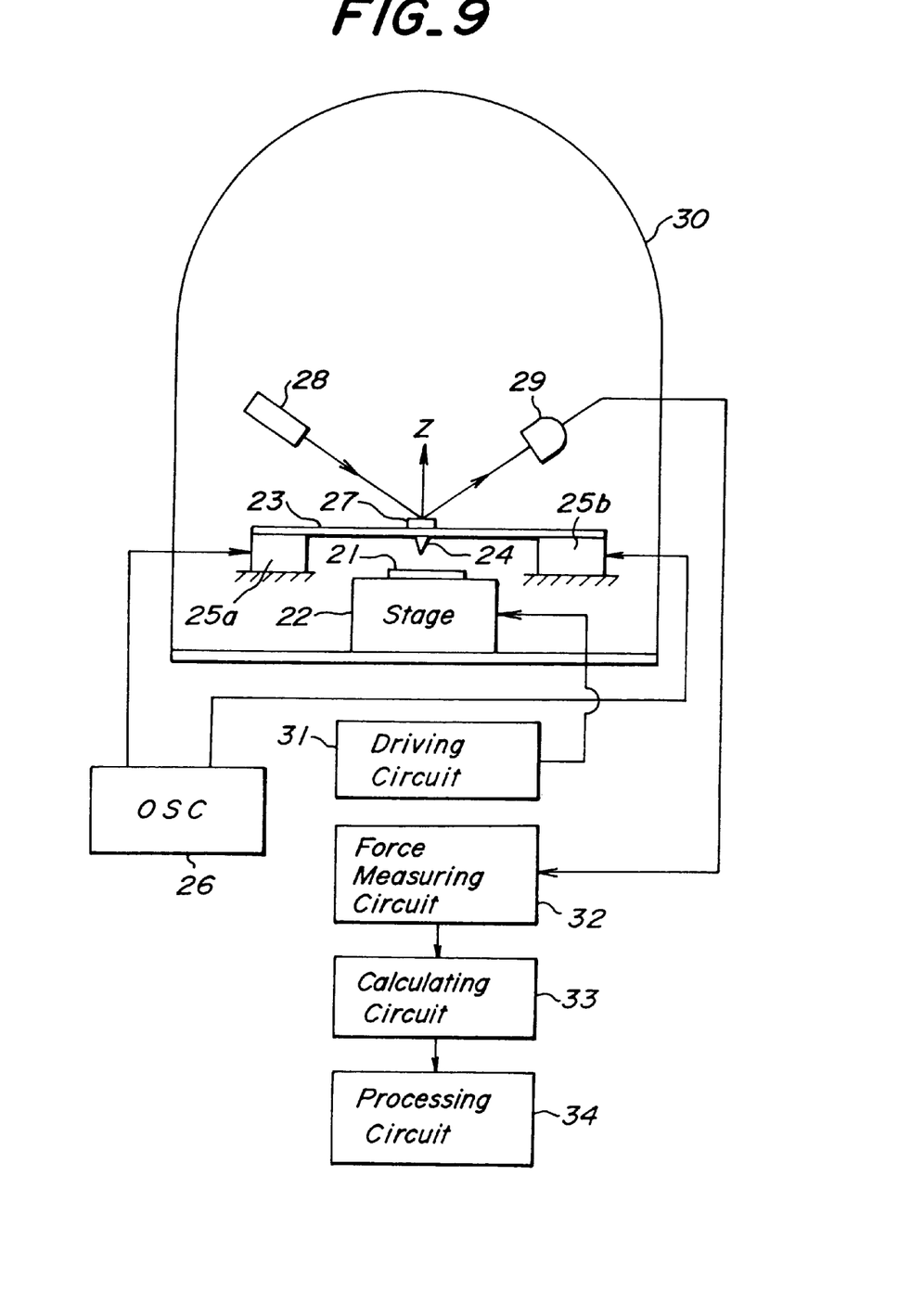
FIG. 9 is a schematic view illustrating an embodiment of an apparatus for measuring the exchange force by the method according to the invention.

FIG. 9 is a schematic view showing an embodiment of the apparatus for measuring the above mentioned RKKY-type exchange force and evaluating magnetic properties of a specimen in accordance with the measured exchange force. A specimen 21 whose magnetic properties are to be evaluated is placed on a stage 22 which can be moved in a three-dimensional manner. Above the specimen stage 22 is arranged a resilient lever 23 whose both ends are secured to a stationary member by means of vibrators 25a and 25b made of a piezoelectric material. The resilient lever 23 is formed by a resilient strip made of silicon, silicon nitride, stainless steel, phosphor bronze and so on. A probe 24 is secured on a lower surface of the resilient lever 23 at its center. It is preferable that the probe 24 has a sharp tip. According to the invention, there is no special limitation for a combination of materials of the specimen 21 and probe 24, the probe may be made of any suitable material from a view of workability, except for a condition due to a property of a magnetic specimen.

The vibrators 25a and 25b made of a piezoelectric material are connected to an oscillator 26 which generates a driving signal having a frequency of several hundreds KHz to vibrate the lever 23 at such a frequency. On the upper surface of the lever 23 is provided a reflection member 27, and a laser light beam emitted by a laser light source 28 is made incident upon the reflection member from an inclined direction. The laser beam reflected by the reflection member 27 is received by a position sensor 29. The position sensor 29 comprises an array of a plurality of light receiving elements and a position upon which the laser beam is made incident can be detected. In this manner, a position of the probe 24 in a direction Z perpendicular to the surface of the specimen 21 can be detected in a very precise manner.

The specimen stage 22, lever 23, laser light source 28 and position sensor 29 are all installed within a vacuum chamber 30 to which a vacuum pump (not shown) is connected. In this manner, a space within the chamber 30 can be maintained at ultra-high vacuum condition, and thus the accurate measurement of the exchange force can be achieved without being influenced by dusts deposited on the specimen 21.

Outside the vacuum chamber 30, there are arranged, in addition to the above mentioned oscillator 26, a driving circuit 31 for driving the specimen stage 22, a force measuring circuit 32 connected to said position sensor 29, a calculating circuit 33 for calculating output signals supplied from the force calculating circuit 33 to derive an exchange force applied to the probe 24, and a processing circuit 34 for processing an output signal supplied from the calculating circuit 34 to evaluate magnetic properties of the specimen 21 on the basis of the measured exchange force applied to the probe 24.

After placing the specimen 21 on the stage 22 and exhausting the vacuum chamber 30, the specimen stage 22 is driven by the driving circuit 31 such that the tip of probe 24 is faced to a given portion of the specimen. In this case, a distance between the specimen 21 and the tip of probe 24 is set to a value within the above mentioned RKKY-type exchange interaction region. Then, the piezo vibrators 25a and 25b are driven by the oscillator 26 such that the resilient lever 23 and thus the probe 24 are vibrated in the direction Z at a given frequency. Due to this vibration, the position of the laser beam impinging upon the position sensor 29 is changed in a periodic manner. When any force is not induced between the specimen 21 and the probe 24, the vibration of the resilient lever 23 is not affected at all and the lever is vibrated at given frequency and amplitude. However, when a force is induced between the specimen 21 and the probe 24, the vibration of the lever 23 is influenced by this force and the frequency and amplitude of the vibration are changed. Therefore, by detecting the vibration of the lever 23 by means of the sensor 29 and force measuring circuit 32, it is possible to measure the force induced between the specimen 21 and the probe 24. As explained above, according to the invention, forces between the specimen 21 and the probe 24 are measured under such conditions that directions of magnetic moments are in parallel with each other and directions of magnetic moments are in anti-parallel with each other, and the exchange force is measured as a difference between both two forces. This may be performed by providing an electromagnetic coil around the probe and flowing a current into a first direction to magnetize the probe in a first direction. After measuring one of the first and second forces, a current is flowed through the coil in a second direction opposite to said first direction to magnetize the probe in a second direction opposite to the first direction, and the other of said first and second forces is measured. During the measurement of the forces, no current flows through the coil, and therefore the measurement of force is not affected at all.

Then, the first and second forces calculated by the force calculating circuit 32 are supplied to the calculating circuit 33 and a difference between both forces is calculated by the calculating circuit 33. Finally, the calculated exchange force is supplied to the processing circuit 34 and magnetic properties of the specimen 21 are evaluated on the basis of the exchange force.

In the method according to the invention, it is preferable to perform the measurement of the exchange force at a plurality of measuring points to derive a plurality of exchange forces while a distance between the specimen and the probe is changed within said RKKY-type region and the magnetic properties of the specimen are evaluated by totally considering said plurality of exchange forces.

Figure 10:
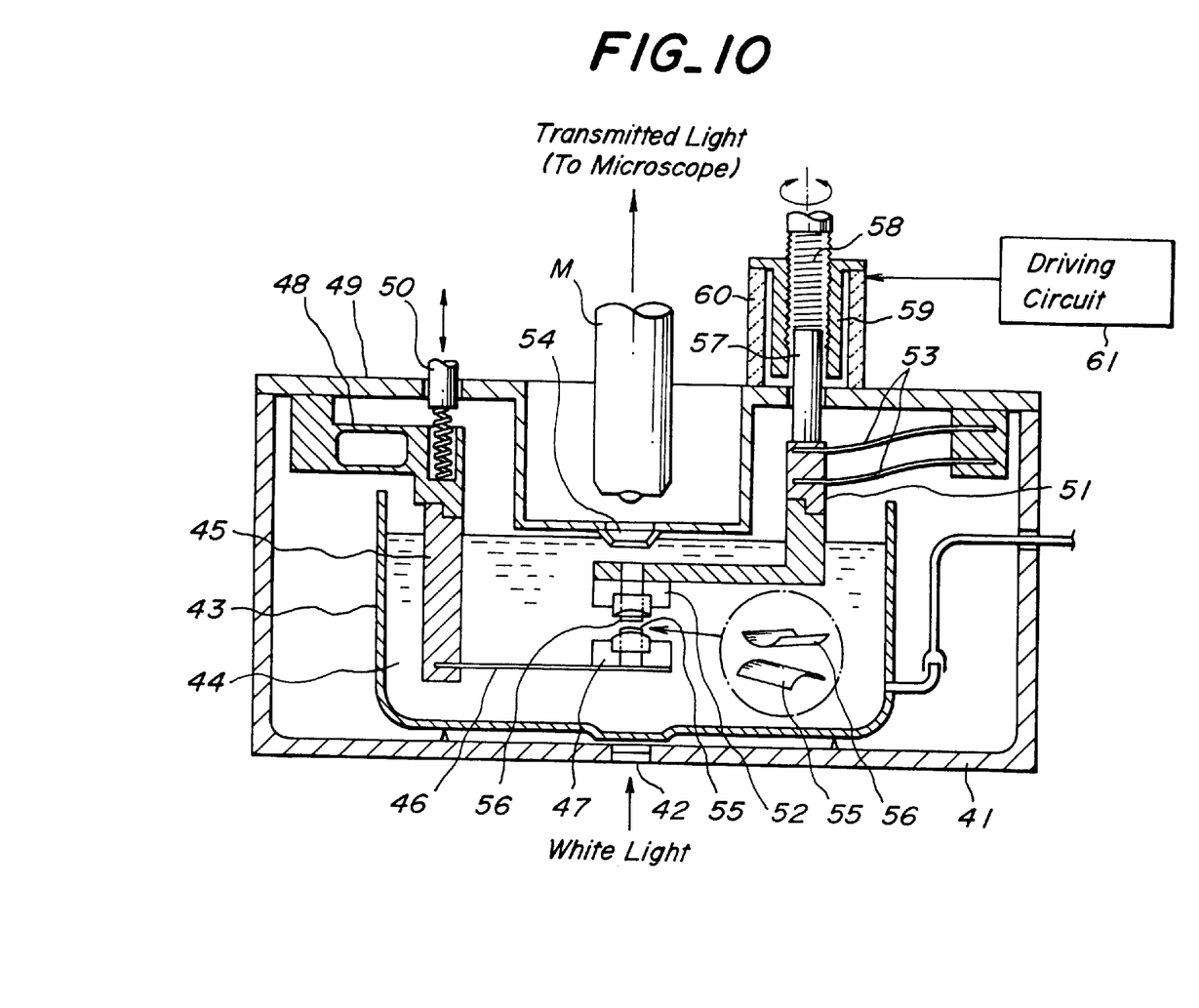
FIG. 10 is a schematic cross sectional view depicting another embodiment of the exchange force measuring apparatus.

FIG. 10 is a schematic view showing another embodiment of the apparatus for measuring the exchange force. In the apparatus shown in FIG. 9, the exchange force is measured as a displacement of the probe with respect to the specimen. In the present embodiment, both specimen and probe are formed as cylindrical bodies and the exchange force is measured as displacements of these cylindrical bodies.

In a bottom wall of an outer vessel 41 made of an opaque material, there is formed a transparent window 42, and white light is introduced within the outer vessel through the transparent window. Within the outer vessel 41 is arranged an inner vessel 43 made of a transparent material, and a transparent liquid such as pure water is contained in the inner vessel. A first supporting rod 45 is immersed in the transparent liquid 44 contained in the inner vessel 43. At a distal end of the supporting rod 45 is secured one end of an arm 46 made of a resilient material, and a specimen holder 47 is provided at the other end of the arm 46. The first supporting rod 45 is secured to a rear surface of a lid-like member 49 by means of a spring block 48. By adjusting a fine adjusting member 50, the first supporting rod 45 can be moved up and down.

In the transparent liquid 44, a second supporting rod 51 is immersed, and a probe holder 52 is secured to a distal end of the second supporting rod 51 in such a manner that the probe holder 52 is opposed to the specimen holder 47. The second supporting rod 51 is secured to the rear surface of the lid-like member 49 by means of parallel leaf springs 53. The lid-like member 49 is made of an opaque material and a transparent window 54 is formed at a center portion of the lid-like member. Light transmitted through the transparent window 54 is inspected by a microscope M. In FIG. 10, only a part of the microscope M is shown.

A specimen 55 is secured to an upper end of the specimen holder 47 supported by the first supporting rod 45 and a probe 56 is secured to a lower end of the probe holder 52 supported by the second supporting rod 51. Each of the specimen 55 and probe 56 is formed as a part of a cylindrical body as illustrated on a partially enlarged scale. These cylindrical bodies are arranged such that their axes are perpendicular to each other. Therefore, the specimen 55 and probe 56 come in close proximity at a single point.

The upper end of the second supporting rod 51 is secured to a rod 57 which is secured to a bolt 58. The bolt 58 is engaged with a nut 59 which is secured to the upper surface of the lid-like member 49 by means of a piezoelectric element 60. The piezoelectric element 60 is connected to a driving circuit 61. By rotating the bolt 58, a height of the second supporting rod 51 can be adjusted up and down, and by driving the piezoelectric element 60 with an AC driving signal supplied from the driving circuit 61, the second supporting rod 51 and thus the probe 52 can be moved up and down at given frequency and amplitude.

At first, the fine adjusting member 50 is operated to move the first supporting rod 45 up and down and the specimen 55 is positioned at a given level. Next, the bold 58 is rotated to move the second supporting rod 51 up and down such that a distance between the specimen 55 and the probe 56 is set to a value within the above explained RKKY-type exchange interaction region. Then, the driving circuit 61 is energized to vibrate the piezoelectric element 60 and the probe 56 is vibrated slightly. Under such a condition, the white light projected through the transparent window 42 and white light transmitted through the specimen 55 and probe 56 is observed by the microscope M. As stated above, since the cylindrical specimen 55 and probe 56 are arranged orthogonally, the light transmitted therebetween is subjected to interference and interference fringes similar to the Newton rings are produced. The thus produced interference fringes are observed by the microscope M. The interference fringes are changed periodically in accordance with the periodic vibration of the probe 56. When a force is induced between the specimen 55 and the probe 56, the periodic change of a pattern of the interference fringes is disturbed. Therefore, by detecting the disturbance of the interference fringes, it is possible to measure a force induced between the specimen 55 and the probe 56. Like as the previous embodiment, by deriving a difference between forces induced between the specimen 55 and the probe 56 is measured under the parallel and anti-parallel configurations, it is possible to measure the exchange force induced between the specimen and the probe.

The method according to he invention may be performed by any other apparatus than those illustrated in FIGS. 9 and 10. Further, in the embodiment shown in FIG. 9, the laser light source and light detecting sensor may be arranged outside the vacuum chamber. In the embodiment depicted in FIG. 10, the specimen and probe may be replaced each other.

As explained above, in the method of measuring the exchange force according to the invention, the exchange force between the specimen and the probe can be measured accurately with an atomic resolution in regardless of compositions of the specimen and probe, while the magnetic property of the specimen is not influenced by the probe. Therefore, in the method of evaluating magnetic properties of a specimen according to the invention, it is possible to evaluate magnetic properties of the specimen accurately on the basis of the measured exchange force.

What is claimed is:

1. A method of measuring an exchange force between two substances each of which contains localized electrons and at least one of which contains conduction electrons, wherein said two substances are faced to each other by a distance within a close proximity region from a distance at which conduction electron clouds begin to be overlapped with each other to a distance at which localized electron clouds are not substantially overlapped with each other, and an exchange force between said two substances is measured.

2. A method of measuring an exchange force between two substances each of which contains localized electrons and at least one of which contains conduction electrons comprising the steps of:

facing said two substances to each other by a distance within a close proximity region from a distance at which conduction electron clouds begin to be overlapped with each other to a distance at which localized electron clouds are not substantially overlapped with each other;

measuring a force between said two substances under such a condition that directions of magnetic moments of said two substances are in parallel with each other to derive a first force;

measuring a force between said two substances under such a condition that directions of magnetic moments of said two substances are in anti-parallel with each other to derive a second force; and deriving a difference between said first and second forces as the exchange force between said two substances.

3. A method of measuring an exchange force between a specimen surface and a probe comprising the steps of:

facing said specimen surface and probe to each other by a distance within a close proximity region from a distance at which conduction electron clouds begin to be overlapped with each other to a distance at which localized electron clouds are not substantially overlapped with each other;

measuring a force applied to said probe under such a condition that directions of magnetic moments of said specimen surface and probe are in parallel with each other to derive a first force;

measuring a applied to said probe under such a condition that directions of magnetic moments of said specimen surface and probe are in anti-parallel with each other to derive a second force; and deriving a difference between said first and second forces as the exchange force between said specimen surface and said probe.

4. A method according to claim 3, wherein said specimen and probe are made of transition metal having a lattice constant a, and the probe is faced to the specimen surface by a distance d while a condition $1.0 \leq d/a \leq 1.7$ is satisfied.

5. A method of evaluating magnetic property of two substances each of which contains localized electrons, at least one of which contains conduction electrons and magnetic property of at least one of which is known, comprising the steps of:

facing said two substances to each other by a distance within a close proximity region from a distance at which conduction electron clouds begin to be overlapped with each other to a distance at which localized electron clouds are not substantially overlapped with each other;

measuring a force between said two substances under such a condition that directions of magnetic moments of said two substances are in parallel with each other to derive a first force;

measuring a force between said two substances under such a condition that directions of magnetic moments of said two substances are in anti-parallel with each other to derive a second force;

deriving a difference between said first and second forces as the exchange force between said two substances; and     evaluating magnetic property of the other of said two substances on the basis of said exchange force between said two substances.

6. A method according to claim 5, wherein the measurement of the exchange force is performed at a plurality of measuring points to derive a plurality of exchange forces while a distance between the specimen and the probe is changed within said close proximate region, and the magnetic properties of the specimen are evaluated by considering said plurality of exchange forces.

7. A method of evaluating magnetic property of a specimen by measuring an exchange force between said specimen and a probe whose magnetic property is known comprises the steps of:

facing said specimen surface and probe to each other by a distance within a close proximity region from a distance at which conduction electron clouds begin to be overlapped with each other to a distance at which localized electron clouds are not substantially overlapped with each other;

measuring a force applied to said probe under such a condition that directions of magnetic moments of said specimen surface and probe are in parallel with each other to derive a first force;

measuring a force applied to said probe under such a condition that directions of magnetic moments of said specimen surface and probe are in anti-parallel with each other to derive a second force;

deriving a difference between said first and second forces as the exchange force between said specimen surface and said probe; and     evaluating the magnetic property of said specimen surface on the basis of said exchange force between said specimen surface and said probe.

8. A method according to claim 7, wherein said specimen and probe are made of transition metal having a lattice constant a, and the probe is faced to the specimen surface by a distance d while a condition $1.0 \leq d/a \leq 1.7$ is satisfied.

9. A method according to claim 8, wherein the measurement of the exchange force is performed at a plurality of measuring points to derive a plurality of exchange forces while a distance between the specimen and the probe is changed within said close proximate region, and the magnetic properties of the specimen are evaluated by considering said plurality of exchange forces.

* * * * *